United States Patent [19]

Holtmyer et al.

[11] Patent Number: 5,304,620
[45] Date of Patent: Apr. 19, 1994

[54] METHOD OF CROSSLINKING CELLULOSE AND GUAR DERIVATIVES FOR TREATING SUBTERRANEAN FORMATIONS

[75] Inventors: Marlin D. Holtmyer; Charles V. Hunt; Mary A. H. Laramay; Alireza B. Rahimi, all of Duncan, Okla.; Murray G. Clark, Conroe, Tex.

[73] Assignee: Halliburton Company, Duncan, Okla.

[21] Appl. No.: 78,945

[22] Filed: Jun. 16, 1993

Related U.S. Application Data

[63] Continuation-in-part of Ser. No. 994,248, Dec. 21, 1992, abandoned.

[51] Int. Cl.$^5$ .............. C09K 7/00; E21B 43/04; E21B 43/25; E21B 43/26
[52] U.S. Cl. .................. 527/310; 527/312; 523/130; 523/131; 166/278; 166/308; 166/305.1; 252/8.551
[58] Field of Search .............. 166/278, 308, 305.1; 252/8.551; 527/310, 312; 523/130, 131

[56] References Cited

U.S. PATENT DOCUMENTS

| | | | |
|---|---|---|---|
| 4,021,355 | 5/1977 | Holtmyer et al. | 166/308 |
| 4,210,206 | 7/1980 | Ely et al. | 166/283 |
| 4,579,670 | 4/1986 | Payne | 252/8.551 |
| 4,801,389 | 1/1989 | Brannon et al. | 252/8.551 |
| 4,982,793 | 1/1991 | Holtmyer et al. | 166/305.1 |
| 5,067,565 | 11/1991 | Holtmyer et al. | 166/305.1 |
| 5,067,566 | 11/1991 | Dawson | 166/308 |
| 5,122,549 | 6/1992 | Holtmyer et al. | 523/130 |

*Primary Examiner*—Ronald W. Griffin
*Attorney, Agent, or Firm*—Robert A. Kent

[57] ABSTRACT

The present invention provides a method of treating of subterranean formation using a gel of a graft copolymer of a hydroxyalkyl cellulose, guar or hydroxypropyl guar prepared by a redox reaction with vinyl phosphonic acid. The gel is formed by hydrating the graft copolymer in an aqueous liquid containing at least a trace amount of at least one divalent cation. The gel is crosslinked by the addition of a Lewis base or Bronsted-Lowry base, which is substantially free of polyvalent metal ions, to the gel in an amount sufficient to effect crosslinking of the graft copolymer.

19 Claims, No Drawings

METHOD OF CROSSLINKING CELLULOSE AND GUAR DERIVATIVES FOR TREATING SUBTERRANEAN FORMATIONS

The present application is a continuation-in-part of U.S. patent application Ser. No. 994,248, filed on Dec. 21, 1992, now abandoned.

BACKGROUND OF THE INVENTION

This invention relates to methods of crosslinking select copolymers of cellulose ether derivatives to form crosslinked aqueous gels which are useful in petroleum recovery operations and any other application requiring a crosslinked viscoelastic gel.

Petroleum recovery operations, such as well stimulation and gravel packing, often require the use of fluid compositions capable of suspending particles. In gravel packing operations, a pack of gravel is placed on the exterior of a perforated or slotted liner or screen which is positioned across an unconsolidated formation. The resulting structure presents a barrier to migrating sand from the formation while still permitting fluid flow. The gravel is carried to the formation in the form of a slurry by mixing gravel with a viscosified fluid. Once the gravel is placed in the wellbore, the viscosified carrier fluid is degraded and returned to the surface.

Treating fluids are used similarly in stimulating subterranean formations. The viscosified fluid carries a propping agent through the wellbore and into both natural fractures and fractures in the formation caused by hydraulic pressure. Once the desired fracture occurs, the fluid is degraded and returned to the surface leaving the proppant in the formation to provide a conductive channel through which formation fluids can flow. In both stimulation and gravel packing operations, the most desirable treating fluid reduces friction pressure as the fluid is pumped through the tubular goods ana transports the propping agent or gravel to the formation without particle settling in the wellbore during placement.

Treating fluids with these properties are generally comprised of a hydratable polysaccharide, including but not limited to guar, guar derivatives, and cellulose derivatives. These polymers viscosify aqueous liquids to form solutions which inhibit particle settling to a limited extent by virtue of viscosity. However, these polymer solutions can approach near zero particle settling rates upon crosslinking with multivalent metal cations to form highly viscoelastic gels. The utility of these gels is well known in the art of petroleum recovery operations.

Cellulose derivatives are the preferred viscosifying polymers for certain petroleum recovery operations because they degrade, i.e., lose viscosity without generating water insoluble particles or residue. The water insoluble particles are believed to remain in the formation and may cause formation plugging or impair the permeability of sand or gravel packs. However, cellulose derivatives have had limited use in many petroleum applications because most derivatives are either salt sensitive or not crosslinkable. Non-ionic derivatives of cellulose are generally not crosslinkable because the polymer lacks a site for attachment of a multivalent metal cation. Examples of this type include hydroxyalkyl cellulose ethers, methyl cellulose, ethyl cellulose, and hydroxyalkyl methyl cellulose. A crosslinkable non-ionic cellulose derivative has been prepared and described in U.S. Pat. Nos. 4,523,010 and 4,552,215 which are herein incorporated by reference. In these disclosures, dihydroxypropyl hydroxyalkyl cellulose is prepared by a condensation reaction of glycidol with hydroxyethyl cellulose under alkaline conditions. The glycidol addition along the HEC polymer chain provides a site of attachment for multivalent metal cations.

Anionic cellulose derivatives are normally substituted with carboxyl groups along the polymer chain. The carboxyl groups complex with polyvalent metal cations, such as aluminum. Gels formed with this chemistry tend to have limited structural stability at formation temperatures of about 250° F. In addition, carboxylate substituents render the polymer salt sensitive, i.e., the viscosity of the polymer in a salt solution is less than the viscosity in water. Salt sensitivity is not a desirable property because the aqueous liquids used in recovery operations most generally contain chloride salts to inhibit the swelling of formation clays.

The present invention provides new and useful methods of effecting crosslinking in selected graft copolymers of cellulose derivatives, which are generally non-ionic in character. Methods of grafting monomers on polyhydroxy containing compounds are well known in the art. The process is described in U.S. Pat. No. 2,922,768, herein incorporated by reference. U.S. Pat. Nos. 4,982,783; 5,067,565; and 5,122,549, the entire disclosures of which are incorporated herein by reference, describe processes by which crosslinkable cellulose derivatives are prepared by grafting vinyl or allyl monomers having a crosslinkable substituent onto the cellulose derivative. The resulting copolymer is non-ionic and crosslinks readily with polyvalent metal cations to form stable viscoelastic gels.

SUMMARY OF THE INVENTION

The surprising discovery now has been made that certain graft copolymers of hydroxyethyl or hydroxypropyl cellulose, prepared by a redox reaction with vinyl phosphonic acid monomers or polymers and hydroxyethyl or hydroxypropyl cellulose, can be crosslinked by the addition of a Lewis base or Bronsted-Lowry base or mixture of such bases to an aqueous solution, which contains at least a trace amount of at least one divalent cation, containing the graft copolymer. The base utilized generally is substantially free of polyvalent metal ions that is, metal ions having more than one valence state. The crosslinked gel formed by the addition of the base can be broken by the addition of an acid generating compound or other conventional breakers. The crosslinked gels are particularly useful in petroleum recovery operations in that the crosslinked cellulose derivatives provide highly viscous gels that can be degraded without generating significant quantities of water insoluble residue. The discovery also has been made that guar and hydroxypropyl guar can be grafted by the described technique and caused to form crosslinked gels upon the addition of a Lewis base or Bronsted-Lowry base.

DESCRIPTION OF THE PREFERRED EMBODIMENTS

The present invention provides a method of crosslinking an aqueous solution of a polymer derivative comprising a graft copolymer of hydroxyethyl cellulose, hydroxypropyl cellulose, guar or hydroxypropyl guar and a method of treating subterranean formations with such crosslinked aqueous gels. The fluid composition can be used in petroleum recovery operations, such as stimulation, gravel packing and other well completion operations such as temporary plugging agents and the like. In these operations, the treating fluid performs a variety of functions, for example, a highly viscoelastic fluid is often times required to transport propping agents or gravel packing materials to the formation without settling. In addition, the treating fluid must have stable viscosity at formation temperatures. The present invention provides such a fluid.

An aqueous liquid is used to solubilize the novel copolymer of the present invention. The term "aqueous liquid" is used hereafter to mean any liquid containing sufficient water to at least partially hydrate the copolymer and result in an increase in the viscosity of the fluid. Aqueous liquids used in petroleum recovery operations normally contain sodium chloride, potassium chloride, calcium chloride, sodium bromide and other bromides, tetramethylammonium chloride or the like to weight the fluid or inhibit the swelling of clays generally found in subterranean formations. The pH of the aqueous liquid must be compatible with the selected crosslinking agent and must not adversely affect the hydration of the copolymer. Such liquids generally contain at least a trace amount of at least one divalent cation, generally in the form of contaminants in the aqueous liquid.

In one embodiment of the present invention, the crosslinkable copolymers are prepared by reacting certain vinyl monomers comprising vinyl phosphonic acid (VPA), with a cellulose derivative using a redox system comprising ceric ions and nitric acid. The generalized reaction is believed to be represented by the formula:

$$Ce^{IV} + RCH_2OH \longleftrightarrow B \longrightarrow Ce^{III} + H^+ + RCH_2O\cdot$$

where B is the ceric-alcohol complex, $RCH_2OH$ is the cellulose derivative and $RCH_2O\cdot$ is a free radical. Graft copolymerizations of cellulose commonly use chemical initiators, such as ceric ions. In acid media, ceric ions oxidize 1,2-glycols with the formation of a free radical on a reducing agent, which is the cellulose derivative in this case. The free radical produced on the cellulose derivative initiates polymerization with the vinyl group of the monomer to produce the graft copolymer.

The cellulose derivative of this invention is preferably a hydroxyalkyl cellulose having a hydroxyalkyl molar substitution from about 1.5 to about 3.0. Molar substitution is defined as the average number of moles of a substituent group present per anhydrogluclose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkylation of the cellulose is preformed in a separate reaction. Hydroxyethyl cellulose is usually formed by reacting ethylene oxide with cellulose under extreme alkaline conditions and is available commercially.

The copolymers of the present invention are rendered crosslinkable by grafting monomers comprising a vinyl phosphonic acid to the cellulose derivative. The monomers have the reactive

moiety that is believed to enable the monomer to attach to the cellulose derivative.

Typically, graft copolymerizations are carried out in aqueous media wherein the polymer is dissolved or dispersed. Copolymers of this invention were prepared in acetone (55% to 90%) and water (45% to 10%) or methanol (about 70%) and water (about 30%). Reactions were carried out in a 1 liter kettle with a stirrer or a 1 liter jar at about 20° C. to about 60° C. The ratio of cellulose derivative to aqueous medium ranges from about 1 gram per 100 ml to about 1 gram per 2 ml. The preferred ratio is from about 1 gram per 6 ml to 1 gram per 4 ml. The ratio of cellulose derivative to grafting VPA monomer ranges from about 3 gram per 1 ml to about 25 gram per 1 ml. The preferred ratio is from about 6 gram per 1 ml to about 16 gram per 1 ml.

The polymerization reaction of the present invention may be chemically initiated by a redox system comprising ceric ions in acidic medium. Ceric ions may be provided, for example, by salts such as ceric nitrate, ceric sulfate, ceric ammonium nitrate, and ceric ammonium sulfate. The preferred ceric initiator of the present invention is a solution of ceric ammonium nitrate in 1N nitric acid. Ceric ammonium nitrate is present in an amount of from about 0.00075 mole per 100 ml to about 0.005 mole per 100 ml reaction medium.

The ceric initiator may be added slowly to the reaction material over a time period of about 30 to 90 seconds or longer. Reaction times vary from about 10 minutes to 20 hours depending on reaction conditions or the particular grafting monomer. Grafting reaction efficiency is generally less than about 50%. After the reaction is complete, the polymerization product is washed with acetone, filtered, and dried.

In another embodiment of the present invention, the crosslinkable copolymers are prepared by reacting certain vinyl monomers having a crosslinkable substituent with a cellulose derivative using a redox system comprising the reaction product of hydrogen peroxide with a ferrous salt. The generalized redox reaction is believed to be represented by the formula:

$$H_2O_2 + Fe^{+2} \rightarrow HO\cdot + HO^- + Fe^{+3}$$

and the generalized initiation reaction is believed to be represented by the general formula:

$$RCH_2OH + HO\cdot \rightarrow H_2O + RCH_2O\cdot$$

An advantage of this initiator is that radical production occurs at a reasonable rate over a wide temperature range whereby reactions can be carried out at room temperature, if desired. The free radical produced on the cellulose derivative initiates polymerization with the vinyl group of the monomer to produce the graft copolymer.

Typically, the graft copolymerization is carried out in aqueous media wherein the polymer is partially dissolved or dispersed. Copolymers were prepared in acetone/water mixtures containing from about 55 to about 90% acetone. Reactions were carried out in a 1 liter kettle with a stirrer or a 1 liter jar at a temperature of from about 20° to about 60° C. The ratio of cellulose derivative to aqueous medium ranges from about 1 gram per 100 ml. to about 1 gram per 2 ml. The preferred ratio is from about 1 gram per 2 to 5 ml. The ratio of cellulose derivative to grafting VPA monomer ranges from about 5 to about 40 grams per 1 gram of monomer. The preferred ratio is from about 6 to about 16. It is to be understood that the ranges set forth above are merely exemplary and that other temperatures, concentrations and the like maybe utilized to prepare the reaction product.

The polymerization reaction of this embodiment of the invention is chemically initiated by a redox system comprising the reaction product of hydrogen peroxide with a ferrous salt. Ferrous ions may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reductants may be utilized in place of the ferrous ions to generate the free radicals necessary to effect grafting and other forms of hydrogen peroxide such as t-butylhydroperoxide may be used.

The initiator may be added slowly to the reaction material over a time period of about 30 to 90 seconds or longer. Reaction times vary from about 15 minutes to about 4 hours depending upon the reaction conditions or the particular grafting monomer. Grafting reaction efficiency (% of monomer grafted) is generally less than about 75%. After the reaction is complete, the polymerization product is washed with acetone, filtered and dried.

In a preferred method of effecting the graft copolymerization, the grafted polymer product is retained in a substantially storage stable slurry form. Typically, the media comprises a polyglycol, such as polypropylene glycol having molecular weights up to about 1000 such as PPG-250 to PPG-1000 from Texaco Chemical Co., various polyethylene glycols and homopolymers of 1,2 butylene oxide having a molecular weight of from about 200 to about 400 which are present in an amount of from about 70 to about 95 percent by weight of the media and the remainder generally being water. The media also may comprise tetramethylammonium chloride in a similar amount or in admixture with a polyglycol. In a preferred embodiment the polyglycol comprises from about 86 to 92 percent by weight of the media. Reactions were carried out in a 5 liter kettle with a stirrer at a temperature of from about 20° to 60° C. The ratio of cellulose derivative to media ranges from about 1 gram per 100 ml to about 1 gram per 2 ml. The preferred ratio is from about 1 gram per 2 to 5 ml. The reaction media also may include a quantity of a dispersant or thixotrope such as alkyl quaternary ammonium montmorillonite (Claytone AF from E.C.C. America, Inc.) or dimethyldicocoammonium chloride to facilitate dispersion of the polymer in the media and improve suspension properties. The grafting reaction is performed as previously described using an appropriate redox system such as the ferrous salt with a source of peroxide. Since the metal ions are not removed from the product by washing as when a dry product is formed, a sequestrant for the metal ions may be added to the slurry at the conclusion of the reaction. The polymerization product has been found to remain readily dispersible or suspended in the slurry form over a period of time to facilitate storage and handling.

This method of grafting functions equally well for guar and hydroxypropyl guar to which vinyl phosphonic acid is grafted. The grafting conditions are as described above.

Graft copolymers of the present invention solubilize in aqueous liquids and substantially increase the viscosity of aqueous liquids. The viscosity of the copolymer solution may be further increased with the addition of a selected crosslinking activator or agent which effects an initiation of a crosslink interaction. Preferred crosslinking activators or agents in accordance with this invention comprise Bronsted-Lowry or Lewis bases which generally are substantially free of polyvalent metal ions that is, metal ions having more than one valence state. Suitable compounds include, for example, calcium oxide, magnesium oxide and compounds selected from the group of mono, di and trialkanol amines such as triethanolamine, sodium hydroxide, potassium hydroxide, ammonia, various cocoamines such as Bis(2-hydroxyethyl) cocoamine, various pentamines such as tetraethylenepentamine, and various other water soluble amines, such as propyldiethanolamine, triethylamine, various water soluble borates such as the commercially available product Polybor, an admixture of boric acid and borate salts, from U.S. Borax and the like in the presence of a divalent cation, such as calcium or magnesium, which is present in at least a trace amount and which may be present in the aqueous liquid utilized to hydrate the copolymer or added as an additional component to the aqueous liquid. Such compounds generally are substantially free of polyvalent metal ions, that is, metal ions having more than one valence state. A particularly preferred crosslinking agent is magnesium oxide. As a result of the limited solubility of magnesium oxide in an aqueous solution, the rate of crosslink development is retarded or delayed such that a gelled fluid can be readily pumped into a wellbore for entry into a subterranean formation before significant crosslinking occurs in the fluid.

A surprising effect has been noted in the crosslinking of the polymer of the present invention in aqueous fluids containing salts. It has been found that when the polymer is hydrated in deionized water to which a small quantity of HCl has been added to facilitate hydration, the pH must be raised by the addition of the crosslinking activator to a level of about 6 before any significant crosslinking occurs. When the polymer is hydrated in an aqueous salt solution, such as for example $CaCl_2$ brine to which a small quantity of HCl is added, the pH at which crosslinking occurs is substantially lower. For example, in a 9 pound per gallon density $CaCl_2$ brine, crosslinking has been found to occur at a pH of about 4.5 and when a 13.5 pound per gallon density $CaCl_2$/$CaBr_2$ brine is employed, crosslinking was found to occur after the addition of sufficient crosslinking activator to raise the pH of the solution to a level of about 1.5.

While the specific mechanism by which the crosslinking occurs is unknown, it is believed that the crosslink is formed through the phosphorus moiety in the graft polymer which is activated by the presence of the Lewis or Bronsted-Lowry base.

While the following description will be directed to the use of magnesium oxide as a crosslinking activator or agent, it is to be understood that the described method would apply generally to any of the other suitable crosslinking activators of the present invention. A base gel is prepared by hydrating the previously described graft copolymer of hydroxyethyl cellulose, hydroxypropyl cellulose, guar or hydroxypropyl guar in an aqueous fluid at a pH in the range of from about 0.1 to about 3.5. The graft copolymer can be admixed with the aqueous fluid in an amount of from about 10 to about 300 pounds per 1000 gallons of fluid. After the gelling agent has substantially hydrated, the base gel is admixed with a quantity of magnesium oxide.

The mixing can be effected in substantially any conventional mixing apparatus. The magnesium oxide generally is admixed with the base gel in an amount of from about 3 to about 30 pounds per 1000 gals of base gel. In a preferred method of addition, the magnesium oxide is added as an aqueous slurry to facilitate handling of the material.

The fluid admixture containing the magnesium oxide then is introduced into a wellbore penetrating a subterranean formation. As the fluid is heated by passage down the wellbore the solubility of magnesium oxide in the fluid increases and the rate of crosslinking accelerates to form a crosslinked gelled fluid for treatment of the subterranean formation. When the fluid is to be used in, for example, a fracturing treatment, suitable particulates comprising any of the various materials known as propping agents may be added to the fluid. Similarly, if the fluid is to be used to perform a gravel pack operation, graded particulates may be added to the fluid before entry into the wellbore to form an appropriate gravel pack in a desired zone of a wellbore within a subterranean formation.

The fluid also can contain any other conventional additive such as gel stabilizers, breakers, clay stabilizers, bactericides, fluid loss additives and the like which do not adversely react with the fluid to prevent its use in a desired manner.

The following examples are provided to illustrate the utility of the composition of the present invention, however the invention is not to be considered as limited by these examples.

EXAMPLE I

To a 5 liter round bottom kettle, equipped with a stirrer, temperature controller and a $N_2$ sparge tube, the following reactants were added, about 2380 grams of PPG-400 (polypropylene- glycol from Texaco Chemical Co.) and about 60 grams Claytone AF (alkyl quaternary ammonium montmorillonite from E.C.C. America, Inc.). The mix is stirred and nitrogen gas sparging is begun. Thereafter 1079 grams of hydroxyethyl cellulose (MS of about 2.2) is added and heating is initiated to slowly raise the temperature to about 40° C. (generally 30 min to 1 hr.). After temperature is reached, the temperature is maintained for about 1 hour to remove oxygen contamination.

While the above mixture is being heated about 319 grams of deionized water are admixed with about 10.5 grams of ferrous ammonium sulfate (reagent grade) in an erlenmeyer flask, while sparging, and dissolved. To this mixture is added about 121 grams of vinyl phosphonic acid from Hoechst Celanese Corporation and mixing and sparging is continued until the materials are dissolved. The solution then is added at the end of the sparging period to the 5 liter kettle.

The temperature is maintained while stirring and sparging and after about 1 hour 17.3 grams of 70% t-butylhydroperoxide is added to the kettle which then is allowed to react for about an hour. After the reaction is completed, a sequestrant, such as DEQUESTO ® 2010 from Monsanto Company, is added to the slurry to sequester the metal ions present and stirred. The reaction mixture then is permitted to cool. The reaction produced a 30% active polymer slurry.

A one (1) liter sample is prepared by mixing a sufficient quantity of the polymer with tap water to yield a 120 pound HEC/1000 gallon solution. To facilitate hydration, sufficient acid, such as 15% hydrochloric acid, is admixed with the solution to correspond to about 10 gallons per 1000 gallons of solution. The acid may be omitted or lesser quantities may be used if slower hydration is acceptable or desired. It is to be understood that other acid concentrations also could be utilized.

After being permitted to hydrate to form a gel, the gel is admixed with the equivalent of about 15 pounds per 1000 gallons of magnesium oxide in the form of an aqueous slurry and a sample is evaluated with a FANN Model 35 ® viscometer. The pH of an aliquot sample also is monitored. The viscometer is equipped with a #1 spring, standard bob and sleeve. The results of the test are set forth below in Table I.

TABLE I

| Time Minutes | Viscometer Dial Reading at 5.11 $Sec^{-1}$ | pH |
|---|---|---|
| 1 | 18 | 1.98 |
| 5 | 18 | 5.28 |
| 6 | 18 | 5.70 |
| 7 | 19 | 5.98 |
| 8 | 20 | 6.17 |
| 9 | 22 | 6.30 |
| 10 | 23 | 6.41 |
| 11 | 25 | 6.50 |
| 12 | 27 | 6.57 |
| 13 | 29 | 6.63 |
| 15 | 33 | 6.74 |
| 20 | 51 | 6.92 |
| 25 | 70 | 7.06 |
| 30 | 93 | 7.17 |

The results clearly demonstrate the crosslink development upon addition of the base to the gelled fluid. The above test is repeated utilizing a 9 pound per gallon density $CaCl_2$ brine instead of tap water. The results of the test are set forth in Table II, below.

TABLE II

| Time Minutes | Viscometer Dial Reading at 5.11 $Sec^{-1}$ | pH |
|---|---|---|
| 1 | 27 | 1.5 |
| 2 | 28 | 3.35 |
| 3 | 27 | 4.29 |
| 4 | 35 | 4.79 |
| 5 | 60 | 5.09 |
| 6 | 160 | 5.29 |
| 7 | 260 | 5.44 |

EXAMPLE II

To further demonstrate the crosslinkability of polymers produced in accordance with the present invention, the following test was performed. A polymer solution corresponding to 120 pounds per 1000 gallons of 9 pound per gallon density $CaCl_2$ brine was prepared to which was added an equivalent of 28 pounds of triethanolamine per 1000 gallons of solution. The fluid then was placed on a FANN Model 50 ® viscometer and evaluated at 176° F. The results of the test are set forth below in Table III.

TABLE III

| Time After Addition Of Crosslink Activator, Minutes | Time At Temperature, Minutes | Fluid Temperature, F. | Apparent Viscosity, (cps) at 170 $Sec^{-1}$ |
|---|---|---|---|
| 24 | 0 | 82 | 1087 |

TABLE III-continued

| Time After Addition Of Crosslink Activator, Minutes | Time At Temperature, Minutes | Fluid Temperature, F. | Apparent Viscosity, (cps) at 170 Sec$^{-1}$ |
|---|---|---|---|
| 28 | 4 | 177 | 919 |
| 43 | 19 | 180 | 924 |
| 58 | 34 | 177 | 947 |
| 73 | 49 | 176 | 910 |
| 88 | 64 | 176 | 902 |
| 103 | 79 | 176 | 995 |
| 118 | 94 | 176 | 991 |
| 133 | 109 | 176 | 952 |
| 148 | 124 | 176 | 973 |

The results of the elevated temperature test clearly demonstrate the stability of the crosslinked gel formed in accordance with the present invention.

EXAMPLE III

To further demonstrate the crosslinkability of the gelled fluids of the present invention with various bases, the following tests were performed.

A polymer solution corresponding to 120 pounds per 1000 gallons of fluid was prepared. The aqueous fluid used was either 2% KCl solution prepared in water containing divalent cations or 9 pound per gallon density $CaCl_2$ brine. The polymer was hydrated by two different methods.

Hydration method I comprised the addition of the gelling agent to a quantity of aqueous fluid followed by addition of further quantities of aqueous fluid during mixing. Hydration method II was the same as 1 with the addition of a quantity of 15% HCl equivalent to 10 gallons/1000 gallons of solution to accelerate the rate of hydration. Quantities of various bases then were admixed with the gel in order to determine the crosslinkability. The results are set forth in Table IV, below.

TABLE IV

| Base | Quantity gallon per 1000 gallon | Aqueous Fluid | Gel Original pH | Gel Final pH | Gel Hydration Method | Comments |
|---|---|---|---|---|---|---|
| Triethanol Amine | 2 | 9#/gal $CaCl_2$ | 1.98 | 4.5 | II | Crosslinked |
| Triethanol Amine | 2 | 9#/gal $CaCl_2$ | 3.05 | 6.04 | I | Crosslinked |
| Triethanol Amine | 2 | 2% KCl | 2.62 | 7.03 | II | Crosslinked |
| Tetraethylene-pentamine | 2 | 9#/gal $CaCl_2$ | 3.0 | 8.5 | I | Crosslinked |
| Bis (2-hydroxyethyl) cocoamine | 6 | 9#/gal $CaCl_2$ | 3.0 | 5.52 | I | Crosslinked |
| Polybor | 30#/1000 gallon | 9#/gal $CaCl_2$ | 3.0 | 5.97 | I | Crosslinked |
| None | 0 | 9#/gal $CaCl_2$ | 3.0 | 3.0 | I | No Crosslink |
| None | 0 | 9#/gal $CaCl_2$ | 1.98 | 1.98 | II | No Crosslink |

EXAMPLE IV

To evaluate the effect of the crosslinked gel of the present invention upon a subterranean formation, the following regained permeability test was performed utilizing a Berea sandstone core sample. The test is performed at a fluid temperature of 150° F. The core sample is placed in the bottom of a vertical Hassler sleeve and a 1.9 cm hollow stainless steel spacer is positioned on top of the core. Annulus pressure of about 200 psi above the highest head pressure (about 500 psi) then is applied to the core. Initially, 250 ml of 15% HCl is flowed downwardly through the core at 50 psi to remove any carbonates from the core. Heated API brine then is flowed upwardly through the core at 20 psi until a stable flow rate is achieved to determine the initial core permeability. This step generally requires 800–1000 ml of fluid. A 200 ml sample of the crosslinked gel of the present invention then is prepared. Immediately after mixing the crosslinking activator with the gel, the gel is poured into a heated reservoir and fluid is flowed across the top of the core until the brine contained in the spacer is fully displaced. The Hassler sleeve then is left fully shut-in for about 1 hour to ensure the gel is fully crosslinked. Thereafter, the valves on the Hassler sleeve are opened and 500 psi pressure is applied to the reservoir containing the crosslinked fluid. This pressure is held for 2 hours and effluent from the bottom valve of the Hassler sleeve is collected to obtain an indication of fluid loss. The bottom valve then is closed and the 500 psi pressure on the reservoir is released. A 15% HCl solution then is flowed across the core to clean out the mandrels and hollow spacer. After approximately 50 ml has passed across the top of the core, the Hassler sleeve is shut in for about 2 hours to permit the acid to break the gel. The valves are opened and a further 50 ml of 15% HCl is flowed across the core to flush any remaining residual gel from the mandrels and hollow spacer. Heated API brine then is flowed at 20 psi upwardly through the core sample until stable flow is achieved and the regained permeability is calculated.

The test fluid corresponded to the fluid of Example I prepared with 9 pound per gallon density $CaCl_2$ brine. The crosslinking activator was MgO admixed at a concentration of 15 pounds per 1000 gallons of fluid. The initial average API brine flow rate through the core was 11.55 ml per min.

The final average API brine flow rate was 11.42 ml per min. The regained permeability was calculated to be 99%. The results clearly demonstrate the substantially non-damaging behavior of the crosslinked gel of the present invention when placed in contact with a formation.

EXAMPLE V

To illustrate the crosslinkability of the grafted hydroxypropyl guar (HPG) copolymer of the present invention in comparison to ungrafted hydroxypropyl guar, the following tests were performed. Samples were prepared corresponding to a 120 pound per 1000 gallons fluid with 9 pound per gallon CaCl$_2$ brine. The first sample contained ungrafted HPG, the second sample contained grafted HPG hydrated in the presence of the equivalent of 10 gallon per 1000 gallons fluid of 15% HCl, the third sample contained grafted HPG hydrated without HCl addition. The grafting was effected as set forth in Example I and yielded a 30% active slurry of the copolymer. Samples No. 1 and 3 were admixed with MgO in an amount equivalent to 10 pounds per 1000 gallons base gel in the form of an aqueous slurry. Sample No. 2 containing HCl was admixed with the equivalent of 15 pounds per 1000 gallons base gel. The results of the test are set forth in Table V, below.

TABLE V

| Time, minutes after crosslink activator addition | Sample No. 1 | Sample No. 2 | Sample No. 3 |
| --- | --- | --- | --- |
| 4 | no crosslinking | no crosslinking | no crosslinking |
| 6 | no crosslinking | 1" lipping crosslink | 2" lipping crosslink |
| 8 | no crosslinking | crosslinked non-pourable | crosslinked non-pourable |
| 10 | no crosslinking | crosslinked non-pourable | crosslinked non-pourable |
| 15 | no crosslinking | crosslinked non-pourable | crosslinked non-pourable |
| 360 | no crosslinking | crosslinked non-pourable | crosslinked non-pourable |

EXAMPLE VI

To demonstrate the stability of the crosslinked gels of the present invention at elevated temperatures, the following test was performed. Samples were prepared with the aqueous fluids identified in Table VI, below. The gelling agent was that of Example I and was present in an amount equivalent to 120 pounds per 1000 gallons of fluid. The equivalent of 10 gallons per 1000 gallons of fluid of 15% HCl was added to the gel to accelerate hydration. The quantity of MgO crosslinking activator added to each sample is set forth in Table VI. The samples then were placed in 12 ounce water sample bottles identified as Citrate of Magnesia bottles. Each sample included 30 pounds per 1000 gallons of fluid of sodium thiosulfate, a conventionally used gel stabilizer, to assist in stabilizing the fluid samples. After about 1 hour, a marble was placed on top of each of the crosslinked gel samples and the samples were placed in a 260° F. oven. The stability of the gel was determined by settling of the marble in the gel sample upon heating and by visible changes in the gel. The results are set forth in Table VII, below.

TABLE VI

| Sample No. | Aqueous Fluid | Crosslink Activator Quantity, Pounds Per 1000 gallon |
| --- | --- | --- |
| 1 | 10.5#/gal NaBr | 20 |
| 2 | 10.5#/gal NaBr | 30 |
| 3 | 8.6#/gal NaCl | 20 |
| 4 | 8.6#/gal NaCl | 30 |
| 5 | 10.0#/gal NaCl | 20 |
| 6 | 10.0#/gal NaCl | 30 |
| 7 | 3% KCl | 20 |
| 8 | 3% KCl | 30 |
| 9 | Synthetic seawater | 20 |
| 10 | Synthetic seawater | 30 |
| 11 | Synthetic seawater | 20 |
| 12 | Synthetic seawater | 30 |
| | + 3% KCl | |

TABLE VII

| Time, hours at 260° F. | SAMPLE NO.'S | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| 24 | Y | Y | Y | Y | F.W. | Y | Y | Y | Y | Y | Y | Y |
| 68 | Y | Y | Y | Y | W.R. | W.R. | Y | Y | Y | Y | Y | Y |
| 96 | L | Y | Y | Y | S | S | Y | Y | Y | Y | Y | Y |

Y: = marble supported on gel surface
F.W.: = free water present in sample bottle, marble on gel surface
W.R.: = water ring around gel in sample bottle, marble on gel surface
S: = about 30–50% free water present and marble on gel surface
L: = sample bottle cap seal leaked, no data collected The foregoing test illustrates the ability of the gels of the present invention to carry a particulate such as proppant or a gravel pack material when exposed to elevated temperatures such as might occur in a subterranean formation.

While that which is believed to comprise preferred embodiments of the invention have been described herein, it is to be understood that changes or modifications in the method may be made by individuals skilled in the art without departing from the spirit or scope of the invention as set forth in the appended claims.

What is claimed is:

1. A method of treating a subterranean formation using a crosslinked cellulose ether, guar or hydroxypropyl guar derivative comprising:

admixing a polymer derivative comprising a reaction product produced by the reaction of (i) a hydroxyalkyl cellulose having a molar substitution of from about 1.5 to about 3, the alkyl being selected from the group of ethyl and propyl, (ii) guar or (iii) hydroxypropyl guar and a vinyl phosphonic acid in the presence of a redox system at a temperature in the range of from about 20° to about 60° C. with a sufficient quantity of an aqueous fluid containing at least a trace amount of at least one divalent cation to form a base gel;

admixing a sufficient quantity of a crosslinking activator comprising a Lewis base or Bronsted-Lowry base which is substantially free of polyvalent metal ions with said base gel to initiate crosslinking of said polymer derivative; and introducing said base gel containing the crosslinking activator into a subterranean formation to treat said formation.

2. The method of claim 1 wherein sufficient base is admixed with said base gel to raise the pH of the solution to a level of about 1.5.

3. The method of claim 1 wherein said aqueous fluid comprises a brine solution.

4. The method of 1 wherein said base is magnesium oxide.

5. The method of claim 1 wherein said base comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts, and diethylamine.

6. A method of treating a subterranean formation comprising:
preparing a treating fluid composition with or without a particulate agent by admixing (i) an aqueous liquid containing at least a trace amount of at least one divalent cation with (ii) a polymer derivative that is chemically modified by reacting at least one member selected from the group of guar, hydroxypropyl guar, hydroxyethyl cellulose and hydroxypropyl cellulose with a vinyl phosphonic acid in the presence of a redox system and (iii) a crosslinking activator comprising a Lewis base or a Bronsted-Lowry base which is substantially free of polyvalent metal ions; and
injecting said treating fluid composition into a wellbore to treat said subterranean formation.

7. The method of claim 6 wherein said chemical modification of said polymer is defined further as reacting said member with a vinyl phosphonic acid in a reaction media comprising at least one member selected from the group of tetramethyl ammonium chloride, polyethylene glycol and polypropylene glycol to which a redox initiator is added.

8. The method of claim 7 defined further to include a dispersant in said reaction media.

9. The method of claim 8 wherein said dispersant comprises at least one member selected from the group of alkyl quaternary ammonium montmorillonite, dimethyldicocoammonium chloride.

10. The method of claim 7 wherein said reaction is defined further to be performed at a temperature in the range of from about 20° to about 60° C.

11. The method of claim 6 wherein said crosslinking activator comprises magnesium oxide.

12. The method of claim 6 wherein said crosslinking activator comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts, and diethylamine.

13. The method of claim 6 wherein said redox system comprises a peroxide and a metal ion reductant.

14. The method of claim 12 wherein said metal ion reductant comprises a source of ferrous ions.

15. A method for crosslinking a cellulose ether derivative for use in treating a well comprising:
preparing a base gel, with or without a particulate agent, by admixing an aqueous liquid containing at least a trace amount of at least one divalent cation with a cellulose ether derivative that is chemically modified by reacting a hydroxyalkyl cellulose with a vinyl phosphonic acid in the presence of a redox system; and
admixing a sufficient quantity of a crosslinking activator comprising a Lewis base or Bronsted-Lowry base, which is substantially free of polyvalent metal ions, with said base gel to effect crosslinking of said gel.

16. The method of claim 15 wherein said crosslinking activator is magnesium oxide.

17. The method of claim 15 wherein said chemical modification of said cellulose ether is defined further as reacting a hydroxyalkyl cellulose having a molar substitution of from about 1.5 to about 3, said alkyl being selected from the group of ethyl and propyl, with a vinyl phosphonic acid in a reaction media comprising at least one member selected from the group of tetramethyl ammonium chloride, polypropylene and polyethylene glycol and polyethylene glycol to which a redox initiator is added.

18. The method of claim 17 defined further to include a dispersant in said reaction media.

19. The method of claim 17 wherein said reaction is defined further as performed at a temperature in the range of from about 20° to about 60° C.

* * * * *